United States Patent Office 3,476,704
Patented Nov. 4, 1969

3,476,704
STABILIZED POLYVINYLCHLORIDE
Arnold Schroeder, Deventer, and Paulus G. J. Nieuwenhuis, Apeldoorn, Netherlands, assignors to Koninklijke Industrieele Maatschappij Noury & Van Der Lande N.V., Deventer, Netherlands, a corporation of the Netherlands
No Drawing. Filed Apr. 6, 1967, Ser. No. 628,848
Claims priority, application Netherlands, Apr. 12, 1966, 6604827
Int. Cl. C08f 45/62
U.S. Cl. 260—45.75      3 Claims

ABSTRACT OF THE DISCLOSURE

Polychloro compounds such as polyvinyl chloride are stabilized by the addition thereto of organotin compounds of the formula

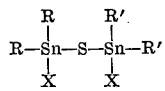

wherein R and R' are each the same or different alkyl groups of 1–12 carbon atoms, and X and X' are the same or different radicals derived from an aliphatic monocarboxylic acid or an aliphatic dicarboxylic acid monoester.

BACKGROUND OF THE INVENTION

Field of the invention

The present invention lies in the field of stabilizing polyvinyl chloride and other organic polychloro compounds.

Description of the prior art

It is already known that polyvinyl chlorides and other polychloro compounds deteriorate on aging and under the influence of light and/or heat, this deterioration often manifesting itself as a discoloration. Many substances have already been proposed as additives to polyvinyl chlorides and other organic polychloro compounds for the purpose of decreasing this deterioration. These additives include soda, lead carbonate, cadmium stearate and organic tin compounds having a tin-sulphur or a tin-oxygen bond, for example dibutyl-tin-bis (laurylmercaptide), dibutyl-tin-bis (isooctylthioglycolate), dibutyl-tin-dilaurate, dibutyl-tin-maleate and dialkyl, diaryl or diaralkyl tin salts of alkyl, aryl or aralkyl monoesters of aliphatic unsaturated dicarboxylic acids.

SUMMARY OF THE INVENTION

It now has been found according to the present invention that other organic tin compounds may be used as stabilizers for polyvinyl chloride and other polychloro compounds, such stabilizers having the general formula

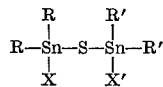

wherein R and R' are the same or different and each represents a saturated aliphatic hydrocarbon group containing 1–12 carbon atoms (for example, methyl, butyl and octyl) and wherein X and X' are the same or different and each represents an aliphatic saturated or unsaturated monocarboxylic acid radical or an aliphatic saturated or unsaturated dicarboxylic acid monoester radical.

The acid radical can include those of acetic acid; diethylacetic acid; 2-ethylhexoic acid; 3,5,5-trimethylhexoic acid; oleic acid; monobutyl maleate; mono-2-ethylhexyl fumarate; mono-2-ethylhexyl succinate; and, particularly, those of lauric acid and mono-2-ethylhexyl maleate.

The preferred added compounds of the stated formula are those in which R and R' each represent butyl or octyl groups and X and X' each represent lauric acid radicals or monobutyl maleate or monooctyl maleate radicals.

Mixtures of the organic tin compounds according to the present invention may also be used as stabilizers. They may be incorporated into the material to be stabilized according to usual methods known in this field, e.g. by mixing on a roll, if desired in admixture with other additives, for example antioxidants, ultraviolet absorbers, coloring agents, pigments, fillers or plasticizers.

DESCRIPTION OF THE PREFERRED EMBODIMENTS

In order still better to illustrate the nature of the present invention the following detailed examples are set forth, it being understood, however, that this description and these examples are presented here by way of illustration only and not as limiting the scope of the invention.

EXAMPLES

A sample of a stabilized polyvinyl chloride was prepared by mixing, on a roll at a temperature of 170°–175° C., 100 parts by weight of a polyvinyl chloride, available under the trade name "Solvic" 229, with 0.57 parts by weight of bis-(dibutylacetoxy-tin) sulphide, and then rolling out the mixture to form a sheet with a thickness of about 0.5 mm. The stabilized sheet thus obtained was heated in an oven with forced circulation at a constant temperature of 170° C. Every 20 minutes, the thermostability was determined by cutting off a sample from the sheet, pressing the sample between aluminum sheets at a temperature of 170° C. and at a pressure of 10 atm. and subsequently determining its color according to the Hazen color scale, as described in A.S.T.M. Standards, D1209–52T (1952).

In the same way, stabilized sheets were prepared by adding to them other stabilizers according to the present invention in such quantities that each sheet contained the same quantity in tin, that is, approximately 0.23 parts by weight.

The stabilizers employed and the values measured are tabulated hereafter:

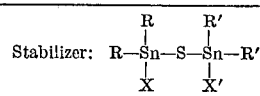

| R | R' | X | X' | Color value according to Hazen after the stated time, in minutes | | | |
|---|---|---|---|---|---|---|---|
| | | | | 70 min. | 90 min. | 110 min. | 130 min. |
| C₄H₉ | C₄H₉ | CH₃COO— | =X | 5–10 | 5–10 | 20 | >150 |
| C₄H₉ | C₄H₉ | (C₂H₅)₂CHCOO— | =X | 5 | 5 | 15–20 | >150 |
| C₄H₉ | C₄H₉ | CH₃(CH₂)₃CH(C₂H₅)COO— | =X | 5 | 5–10 | 20–25 | >150 |
| C₄H₉ | C₄H₉ | (CH₃)₃CCH₂CH(CH₃)CH₂COO— | =X | 5 | 5–10 | 25 | >150 |
| C₄H₉ | C₄H₉ | CH₃(CH₂)₁₀COO— | =X | 5 | 5 | 5–10 | 10–15 |
| C₈H₁₇ | C₈H₁₇ | CH₃(CH₂)₁₀COO— | =X | 5 | 5–10 | 100 | >150 |
| C₄H₉ | C₈H₁₇ | CH₃(CH₂)₁₀COO— | =X | 5 | 5 | 10 | 35 |
| CH₃ | CH₃ | CH₃COO— | =X | 10 | 20 | 45 | >150 |
| C₄H₉ | C₄H₉ | CH₃(CH₂)₃CH(C₂H₅)CH₂OCOCH:CHCOO— | =X | 5 | 5 | 5 | 20 |
| i-C₄H₉ | i-C₄H₉ | CH₃(CH₂)₃CH(C₂H₅)CH₂OCOCH:CHCOO— | CH₃(CH₂)₁₀COO— | 5 | 5 | 5–10 | 20 |

The preferred amount of the one or more additives employed according to the present invention is such as to give a tin content in the range of 0.2 to 0.4 parts by weight, though lesser or greater amounts can be used.

While specific examples of preferred methods embodying the present invention have been set forth above, it will be understood that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:

1. A composition consisting essentially of polyvinylchloride and a stabilizing amount of a compound of the general formula:

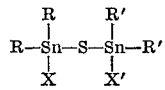

wherein R and R' are the same or different and each represents a saturated hydrocarbon group containing 1–12 carbon atoms and wherein X and X' are the same or different and each represents an aliphatic monocarboxylic radical or an aliphatic dicarboxylic acid monoester radical.

2. A composition according to claim 1 in which the stabilizing compound is present in an amount equivalent to 0.2 to 0.4 parts by weight of tin per 100 parts by weight of polyvinylchloride.

3. A composition according to claim 1 in which R and R' each represents a saturated aliphatic hydrocarbon group selected from the group consisting of butyl and octyl and X and X' each represents a lauric acid, a 2-ethylhexoic acid or a 3,5,5-trimethylhexoic acid radical or an aliphatic unsaturated dicarboxylic acid monoester radical selected from the group consisting of monobutylmaleate and monooctylmaleate radicals.

References Cited
UNITED STATES PATENTS

| | | | |
|---|---|---|---|
| 2,770,611 | 11/1956 | Nitzche et al. | 260—45.75 |
| 2,832,753 | 4/1958 | Weinkerg et al. | 260—45.75 |
| 3,108,126 | 10/1963 | Crauland | 260—429.7 |

DONALD E. CZAJA, Primary Examiner

V. P. HOKE, Assistant Examiner